(12) United States Patent
Mitani et al.

(10) Patent No.: US 12,556,006 B2
(45) Date of Patent: Feb. 17, 2026

(54) POWER SUPPLY SYSTEM, AND MOVING OBJECT INCLUDING POWER SUPPLY SYSTEM

(71) Applicant: HONDA MOTOR CO., LTD., Tokyo (JP)

(72) Inventors: Manabu Mitani, Wako (JP); Takeshi Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/618,326

(22) Filed: Mar. 27, 2024

(65) Prior Publication Data
US 2024/0332978 A1    Oct. 3, 2024

(30) Foreign Application Priority Data
Mar. 31, 2023    (JP) ................. 2023-056845

(51) Int. Cl.
*H02J 3/38*    (2006.01)
*B64D 27/35*    (2024.01)
*B60L 50/60*    (2019.01)

(52) U.S. Cl.
CPC ............ *H02J 3/38* (2013.01); *B60L 50/60* (2019.02); *B60L 2200/10* (2013.01); *B64D 27/35* (2024.01)

(58) Field of Classification Search
CPC ........ H02J 3/38; B60L 50/60; B60L 2200/10; B60L 3/0092; B60L 3/04; B64D 27/35
See application file for complete search history.

(56) References Cited

U.S. PATENT DOCUMENTS
2022/0204173 A1    6/2022    Barraco et al.

FOREIGN PATENT DOCUMENTS
JP    2022-529997 A    6/2022

*Primary Examiner* — Daniel Cavallari
(74) *Attorney, Agent, or Firm* — Rankin, Hill & Clark LLP

(57) ABSTRACT

A power supply system includes: a first connection circuit including a first connector and a second connector that are capable of connecting a first power supply circuit and a second power supply circuit to each other; a first positive side contactor provided in the first power supply circuit; a second positive side contactor provided in the second power supply circuit; a first control device for controlling the first connector and the first positive side contactor; and a second control device for controlling the second connector and the second positive side contactor.

5 Claims, 7 Drawing Sheets

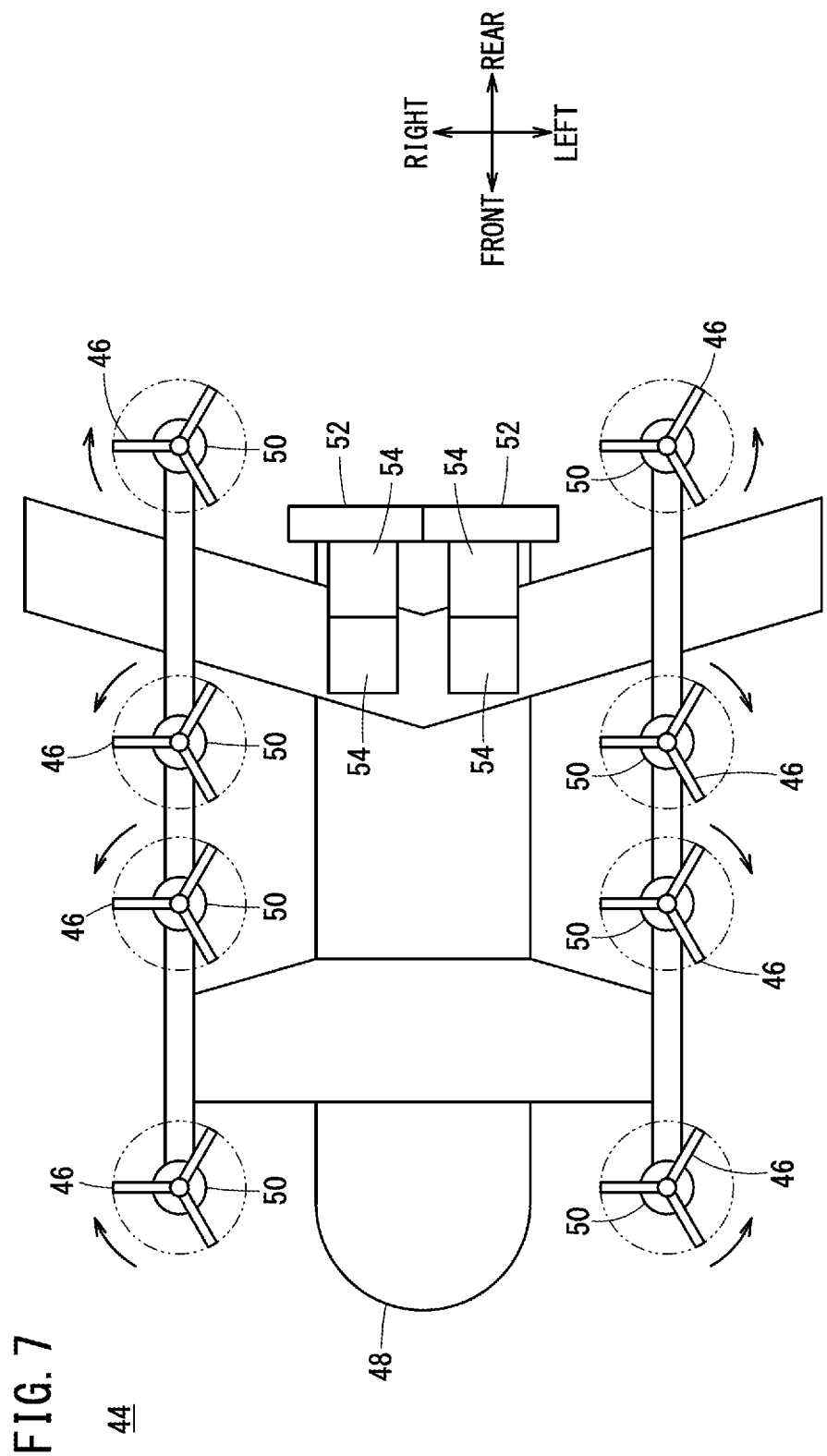

POWER SUPPLY SYSTEM, AND MOVING OBJECT INCLUDING POWER SUPPLY SYSTEM

CROSS-REFERENCE TO RELATED APPLICATIONS

This application is based upon and claims the benefit of priority from Japanese Patent Application No. 2023-056845 filed on Mar. 31, 2023, the contents of which are incorporated herein by reference.

BACKGROUND OF THE INVENTION

Field of the Invention

The present invention relates to a power supply system, and a moving object including the power supply system.

Description of the Related Art

In recent years, research and development have been conducted on electrification technology that contributes to energy efficiency in order to ensure that more people have access to affordable, reliable, sustainable and modern energy.

JP 2022-529997 A discloses an aircraft electrical energy supply network (power supply system).

SUMMARY OF THE INVENTION

In the technology related to the electrification technology, there has been a demand for a more satisfactory power supply system, and a moving object including the more satisfactory power supply system.

The present invention has the object of solving the aforementioned problem.

According to a first aspect of the present invention, there is provided a power supply system comprising: a first power supply circuit configured to supply, to a first load device, direct current electric power output from a first main power source device; a second power supply circuit configured to supply, to a second load device, direct current electric power output from a second main power source device; a first connection circuit including a first connector and a second connector that are configured to connect the first power supply circuit and the second power supply circuit to each other; a first contactor provided in the first power supply circuit; a second contactor provided in the second power supply circuit; a first control device configured to control the first connector and the first contactor; and a second control device configured to control the second connector and the second contactor.

According to a second aspect of the present invention, there is provided a moving object comprising the power supply system according to the first aspect.

According to the present invention, it is possible to provide a more satisfactory power supply system, and a moving object including the more satisfactory power supply system. This in turn contributes to energy efficiency.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 7 is a schematic view of a moving object.

DETAILED DESCRIPTION OF THE INVENTION

First Embodiment

[Configuration of Power Supply System]

Figure 1:
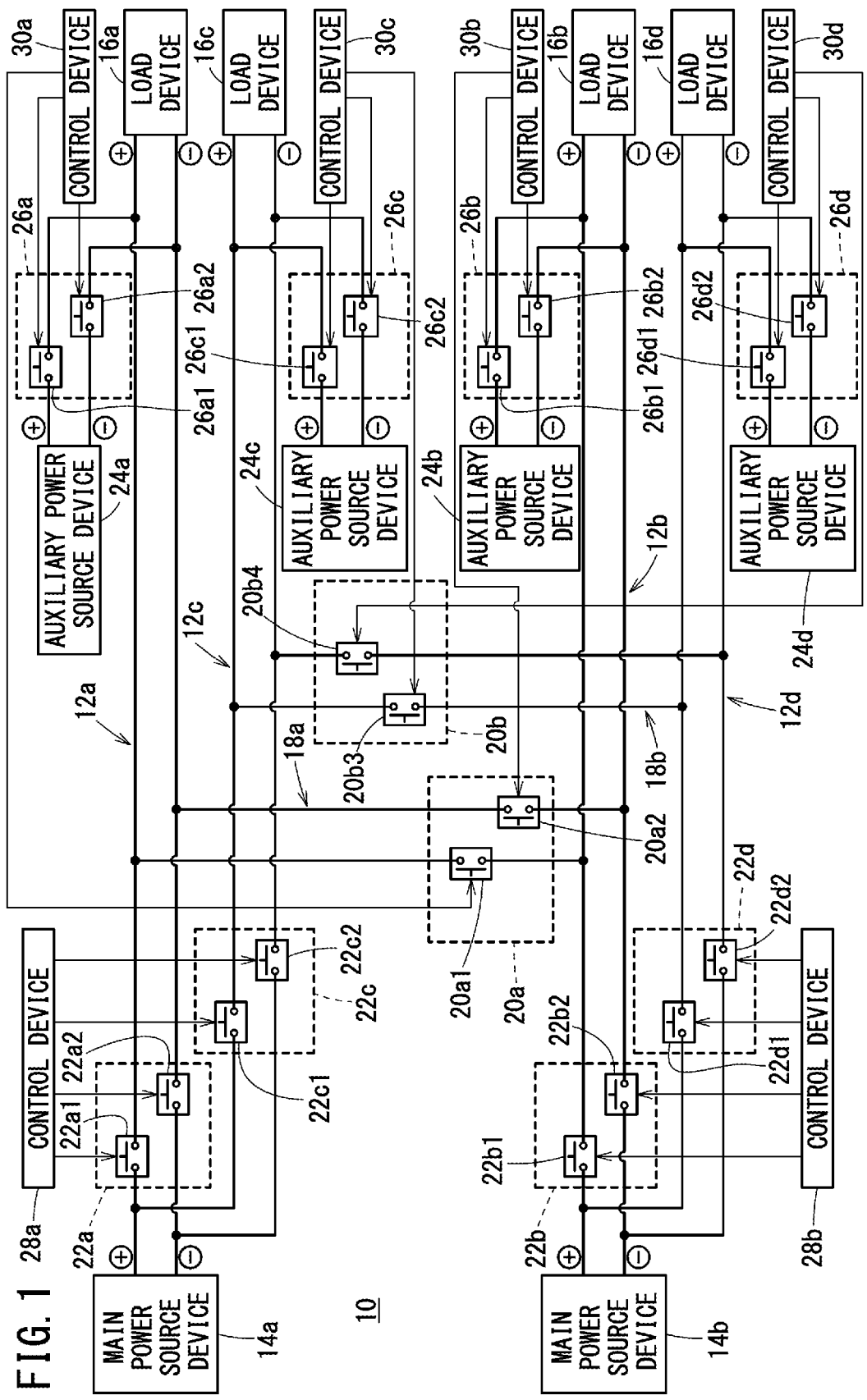
FIG. 1 is a schematic view of a power supply system.

A power supply system of the present embodiment will be described with reference to the drawings. FIG. 1 is a schematic view of a power supply system 10.

The power supply system 10 includes a first power supply circuit 12a, a second power supply circuit 12b, a third power supply circuit 12c, and a fourth power supply circuit 12d. The first power supply circuit 12a supplies, to a first load device 16a, the DC power output from a first main power source device 14a. The second power supply circuit 12b supplies, to a second load device 16b, the DC power output from a second main power source device 14b. The third power supply circuit 12c supplies, to a third load device 16c, the DC power output from the first main power source device 14a. The fourth power supply circuit 12d supplies, to a fourth load device 16d, the DC power output from the second main power source device 14b.

The first main power source device 14a and the second main power source device 14b each include an engine, a generator, and a power control unit (all of them not shown). The engine drives the generator, and the generator generates three-phase AC power. The power control unit converts the three-phase AC power into DC power.

The first main power source device 14a and the second main power source device 14b may each include a lithium ion battery. The first main power source device 14a and the second main power source device 14b may each include a secondary battery other than the lithium ion battery. The first main power source device 14a and the second main power source device 14b may each include a primary battery. The first main power source device 14a and the second main power source device 14b may each include a large-capacity capacitor.

The first main power source device 14a and the second main power source device 14b may each include various sensors such as a voltage sensor and a current sensor, and elements such as a fuse, a relay, a breaker, a diode, a transistor, a resistor, a coil, and a capacitor.

The first load device 16a, the second load device 16b, the third load device 16c, and the fourth load device 16d each include an inverter and an electric motor (both of them not shown). The inverter converts the input DC power into three-phase AC power, and the electric motor is driven by the three-phase AC power. The first load device 16a, the second load device 16b, the third load device 16c, and the fourth load device 16d may each include a DC/DC converter and a low-voltage drive device (both of them not shown).

The DC/DC converter lowers the voltage of the input DC power, and the low-voltage drive device is driven by the DC power.

The first load device 16a, the second load device 16b, the third load device 16c, and the fourth load device 16d may each include various sensors such as a voltage sensor and a current sensor, and elements such as a fuse, a relay, a breaker, a diode, a transistor, a resistor, a coil, and a capacitor.

The power supply system 10 includes a first connection circuit 18a and a second connection circuit 18b. The first connection circuit 18a is provided with a connection device 20a capable of connecting the first power supply circuit 12a and the second power supply circuit 12b. The second connection circuit 18b is provided with a connection device 20b capable of connecting the third power supply circuit 12c and the fourth power supply circuit 12d.

The connection device 20a includes a first connector 20a1 and a second connector 20a2. The first connector 20a1 is provided on the positive wire of the first connection circuit 18a. The second connector 20a2 is provided on the negative wire of the first connection circuit 18a. The connection device 20b includes a third connector 20b3 and a fourth connector 20b4. The third connector 20b3 is provided on the positive wire of the second connection circuit 18b. The fourth connector 20b4 is provided on the negative wire of the second connection circuit 18b.

The first connector 20a1, the second connector 20a2, the third connector 20b3, and the fourth connector 20b4 are contactors. The first connector 20a1, the second connector 20a2, the third connector 20b3, and the fourth connector 20b4 may be relays. The first connector 20a1, the second connector 20a2, the third connector 20b3 and the fourth connector 20b4 may be breakers. The first connector 20a1, the second connector 20a2, the third connector 20b3, and the fourth connector 20b4 may be semiconductor switches.

When both the first connector 20a1 and the second connector 20a2 are closed, the first power supply circuit 12a and the second power supply circuit 12b are connected. When at least one of the first connector 20a1 or the second connector 20a2 is opened, the connection between the first power supply circuit 12a and the second power supply circuit 12b is interrupted.

When both the third connector 20b3 and the fourth connector 20b4 are closed, the third power supply circuit 12c and the fourth power supply circuit 12d are connected. When at least one of the third connector 20b3 or the fourth connector 20b4 is opened, the connection between the third power supply circuit 12c and the fourth power supply circuit 12d is interrupted.

Normally, the connection between the first power supply circuit 12a and the second power supply circuit 12b is cut off. Thus, when an abnormality occurs in one of the first power supply circuit 12a or the second power supply circuit 12b, the other can be prevented from being affected by the abnormality. For example, when an overcurrent occurs in one of the first power supply circuit 12a or the second power supply circuit 12b, the overcurrent is prevented from flowing to the other.

Similarly, the connection between the third power supply circuit 12c and the fourth power supply circuit 12d is normally cut off. Thus, when an abnormality occurs in one of the third power supply circuit 12c or the fourth power supply circuit 12d, the other can be prevented from being affected by the abnormality. For example, when an overcurrent occurs in one of the third power supply circuit 12c or the fourth power supply circuit 12d, the overcurrent is prevented from flowing to the other.

When the supply of electric power from the first main power source device 14a to the first power supply circuit 12a and the third power supply circuit 12c is cut off, the first power supply circuit 12a and the second power supply circuit 12b are connected by the connection device 20a. Further, the third power supply circuit 12c and the fourth power supply circuit 12d are connected by the connection device 20b. As a result, electric power is supplied from the second main power source device 14b to the first power supply circuit 12a and the third power supply circuit 12c.

When the supply of electric power from the second main power source device 14b to the second power supply circuit 12b and the fourth power supply circuit 12d is cut off, the first power supply circuit 12a and the second power supply circuit 12b are connected by the connection device 20a. Further, the third power supply circuit 12c and the fourth power supply circuit 12d are connected by the connection device 20b. As a result, electric power is supplied from the first main power source device 14a to the second power supply circuit 12b and the fourth power supply circuit 12d.

The power supply system 10 includes contactor devices 22a to 22d. The contactor device 22a can disconnect the first main power source device 14a from the first power supply circuit 12a and the first connection circuit 18a. The contactor device 22b can disconnect the second main power source device 14b from the second power supply circuit 12b and the first connection circuit 18a. The contactor device 22c can disconnect the first main power source device 14a from the third power supply circuit 12c and the second connection circuit 18b. The contactor device 22d can disconnect the second main power source device 14b from the fourth power supply circuit 12d and the second connection circuit 18b.

The contactor device 22a includes a first positive side contactor 22a1 and a first negative side contactor 22a2. The first positive side contactor 22a1 is provided on a positive wire connecting the first main power source device 14a and the first power supply circuit 12a. The first negative side contactor 22a2 is provided on a negative wire connecting the first main power source device 14a and the first power supply circuit 12a.

The contactor device 22b includes a second positive side contactor 22b1 and a second negative side contactor 22b2. The second positive side contactor 22b1 is provided on a positive wire connecting the second main power source device 14b and the second power supply circuit 12b. The second negative side contactor 22b2 is provided on a negative wire connecting the second main power source device 14b and the second power supply circuit 12b.

The contactor device 22c includes a third positive side contactor 22c1 and a third negative side contactor 22c2. The third positive side contactor 22c1 is provided on a positive wire connecting the first main power source device 14a and the third power supply circuit 12c. The third negative side contactor 22c2 is provided on a negative wire connecting the first main power source device 14a and the third power supply circuit 12c.

The contactor device 22d includes a fourth positive side contactor 22d1 and a fourth negative side contactor 22d2. The fourth positive side contactor 22d1 is provided on a positive wire connecting the second main power source device 14b and the fourth power supply circuit 12d. The fourth negative side contactor 22d2 is provided on a negative wire connecting the second main power source device 14b and the fourth power supply circuit 12d.

The first positive side contactor 22a1, the first negative side contactor 22a2, the second positive side contactor 22b1, the second negative side contactor 22b2, the third positive side contactor 22c1, the third negative side contactor 22c2, the fourth positive side contactor 22d1, and the fourth negative side contactor 22d2 may be relays. The first positive side contactor 22a1, the first negative side contactor 22a2, the second positive side contactor 22b1, the second negative side contactor 22b2, the third positive side contactor 22c1, the third negative side contactor 22c2, the fourth positive side contactor 22d1, and the fourth negative side contactor 22d2 may be breakers. The first positive side contactor 22a1, the first negative side contactor 22a2, the second positive side contactor 22b1, the second negative side contactor 22b2, the third positive side contactor 22c1, the third negative side contactor 22c2, the fourth positive side contactor 22d1, and the fourth negative side contactor 22d2 may be semiconductor switches.

The power supply system 10 includes a first auxiliary power source device 24a, a second auxiliary power source device 24b, a third auxiliary power source device 24c, and a fourth auxiliary power source device 24d. The first auxiliary power source device 24a is connected to the first power supply circuit 12a in parallel with the first main power source device 14a. The second auxiliary power source device 24b is connected to the second power supply circuit 12b in parallel with the second main power source device 14b. The third auxiliary power source device 24c is connected to the third power supply circuit 12c in parallel with the first main power source device 14a. The fourth auxiliary power source device 24d is connected to the fourth power supply circuit 12d in parallel with the second main power source device 14b.

The first auxiliary power source device 24a, the second auxiliary power source device 24b, the third auxiliary power source device 24c, and the fourth auxiliary power source device 24d each include a lithium ion battery. The first auxiliary power source device 24a, the second auxiliary power source device 24b, the third auxiliary power source device 24c, and the fourth auxiliary power source device 24d may each include a secondary battery other than the lithium ion battery. The first auxiliary power source device 24a, the second auxiliary power source device 24b, the third auxiliary power source device 24c, and the fourth auxiliary power source device 24d may each include a large-capacity capacitor.

The first auxiliary power source device 24a, the second auxiliary power source device 24b, the third auxiliary power source device 24c, and the fourth auxiliary power source device 24d may each include various sensors such as a voltage sensor and a current sensor, and elements such as a fuse, a relay, a breaker, a diode, a transistor, a resistor, a coil, and a capacitor.

The power supply system 10 includes contactor devices 26a to 26d. The contactor device 26a can disconnect the first auxiliary power source device 24a from the first power supply circuit 12a and the first load device 16a. The contactor device 26b can disconnect the second auxiliary power source device 24b from the second power supply circuit 12b and the second load device 16b. The contactor device 26c can disconnect the third auxiliary power source device 24c from the third power supply circuit 12c and the third load device 16c. The contactor device 26d can disconnect the fourth auxiliary power source device 24d from the fourth power supply circuit 12d and the fourth load device 16d.

The contactor device 26a includes a first positive side contactor 26a1 and a first negative side contactor 26a2. The first positive side contactor 26a1 is provided on a positive wire connecting the first auxiliary power source device 24a and the first power supply circuit 12a. The first negative side contactor 26a2 is provided on a negative wire connecting the first auxiliary power source device 24a and the first power supply circuit 12a. The first positive side contactor 26a1 corresponds to a first contactor of the present invention.

The contactor device 26b includes a second positive side contactor 26b1 and a second negative side contactor 26b2. The second positive side contactor 26b1 is provided on a positive wire connecting the second auxiliary power source device 24b and the second power supply circuit 12b. The second negative side contactor 26b2 is provided on a negative wire connecting the second auxiliary power source device 24b and the second power supply circuit 12b. The second positive side contactor 26b1 corresponds to a second contactor of the present invention.

The contactor device 26c includes a third positive side contactor 26c1 and a third negative side contactor 26c2. The third positive side contactor 26c1 is provided on a positive wire connecting the third auxiliary power source device 24c and the third power supply circuit 12c. The third negative side contactor 26c2 is provided on a negative wire connecting the third auxiliary power source device 24c and the third power supply circuit 12c. The third positive side contactor 26c1 corresponds to a third contactor of the present invention.

The contactor device 26d includes a fourth positive side contactor 26d1 and a fourth negative side contactor 26d2. The fourth positive side contactor 26d1 is provided on a positive wire connecting the fourth auxiliary power source device 24d and the fourth power supply circuit 12d. The fourth negative side contactor 26d2 is provided on a negative wire connecting the fourth auxiliary power source device 24d and the fourth power supply circuit 12d. The fourth positive side contactor 26d1 corresponds to a fourth contactor of the present invention.

The first positive side contactor 26a1, the first negative side contactor 26a2, the second positive side contactor 26b1, the second negative side contactor 26b2, the third positive side contactor 26c1, the third negative side contactor 26c2, the fourth positive side contactor 26d1, and the fourth negative side contactor 26d2 may be relays. The first positive side contactor 26a1, the first negative side contactor 26a2, the second positive side contactor 26b1, the second negative side contactor 26b2, the third positive side contactor 26c1, the third negative side contactor 26c2, the fourth positive side contactor 26d1, and the fourth negative side contactor 26d2 may be breakers. The first positive side contactor 26a1, the first negative side contactor 26a2, the second positive side contactor 26b1, the second negative side contactor 26b2, the third positive side contactor 26c1, the third negative side contactor 26c2, the fourth positive side contactor 26d1, and the fourth negative side contactor 26d2 may be semiconductor switches.

The power supply system 10 includes a first control device 28a and a second control device 28b. The first control device 28a controls the first positive side contactor 22a1 and the first negative side contactor 22a2 of the contactor device 22a. The first control device 28a controls the third positive side contactor 22c1 and the third negative side contactor 22c2 of the contactor device 22c. The second control device 28b controls the second positive side contactor 22b1 and the second negative side contactor 22b2 of the contactor device 22b. The second control device 28b controls the fourth positive side contactor 22d1 and the fourth negative side contactor 22d2 of the contactor device 22d.

The power supply system 10 includes a first control device 30a, a second control device 30b, a third control device 30c, and a fourth control device 30d. The first control device 30a controls the first positive side contactor 26a1 and the first negative side contactor 26a2 of the contactor device 26a. The first control device 30a controls the first connector 20a1 of the connection device 20a. The second control device 30b controls the second positive side contactor 26b1 and the second negative side contactor 26b2 of the contactor device 26b. The second control device 30b controls the second connector 20a2 of the connection device 20a. The third control device 30c controls the third positive side contactor 26c1 and the third negative side contactor 26c2 of the contactor device 26c. The third control device 30c controls the third connector 20b3 of the connection device 20b. The fourth control device 30d controls the fourth positive side contactor 26d1 and the fourth negative side contactor 26d2 of the contactor device 26d. The fourth control device 30d controls the fourth connector 20b4 of the connection device 20b.

When no signal is input from the first control device 30a to the first connector 20a1 of the connection device 20a, the first connector 20a1 is opened, and when a signal is input from the first control device 30a to the first connector 20a1, the first connector 20a1 is closed. Similarly, when no signal is input from the second control device 30b to the second connector 20a2 of the connection device 20a, the second connector 20a2 is opened, and when a signal is input from the second control device 30b to the second connector 20a2, the second connector 20a2 is closed. That is, the first connector 20a1 and the second connector 20a2 are both normally-open connectors.

When no signal is input from the third control device 30c to the third connector 20b3 of the connection device 20b, the third connector 20b3 is opened, and when a signal is input from the third control device 30c to the third connector 20b3, the third connector 20b3 is closed. Similarly, when no signal is input from the fourth control device 30d to the fourth connector 20b4 of the connection device 20b, the fourth connector 20b4 is opened, and when a signal is input from the fourth control device 30d to the fourth connector 20b4, the fourth connector 20b4 is closed. That is, the third connector 20b3 and the fourth connector 20b4 are both normally-open connectors.

The power supply system 10 may include various sensors such as a voltage sensor and a current sensor, and elements such as a diode, a transistor, a fuse, a resistor, a coil, and a capacitor, in addition to the above-described configuration.

[Operation of Power Supply System in Normal State]

Figure 2:
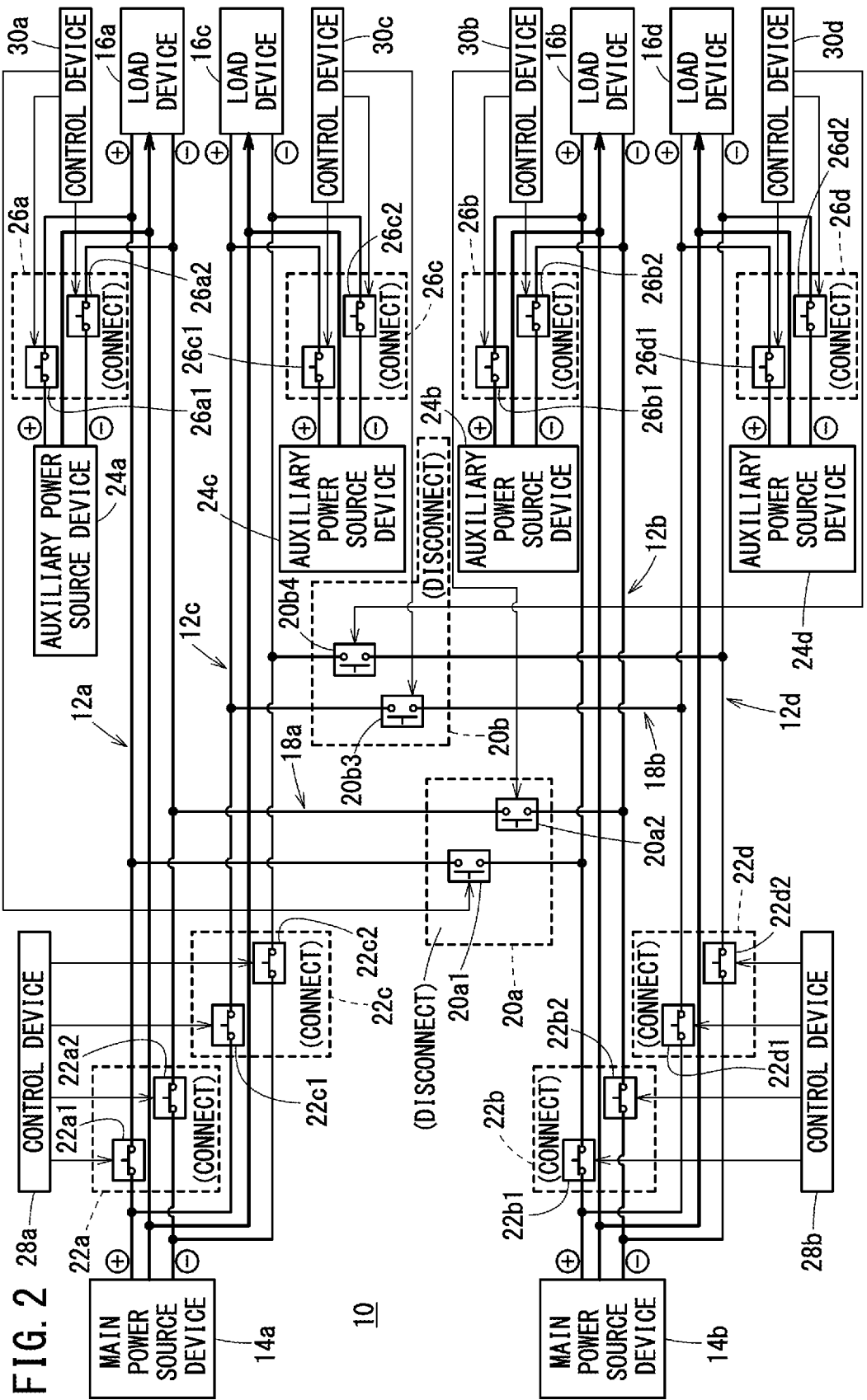
FIG. 2 is a diagram showing the operation of the power supply system in a normal state.

FIG. 2 is a diagram showing the operation of the power supply system 10 in a normal state. Arrows shown in FIG. 2 indicate electric power supply paths.

The first control device 28a controls the contactor device 22a to close both the first positive side contactor 22a1 and the first negative side contactor 22a2. Further, the first control device 28a controls the contactor device 22c to close both the third positive side contactor 22c1 and the third negative side contactor 22c2. As a result, the first main power source device 14a is connected to the first power supply circuit 12a by the contactor device 22a, and the first main power source device 14a is connected to the third power supply circuit 12c by the contactor device 22c. Therefore, electric power is supplied from the first main power source device 14a to the first load device 16a and the third load device 16c.

The second control device 28b controls the contactor device 22b to close both the second positive side contactor 22b1 and the second negative side contactor 22b2. Further, the second control device 28b controls the contactor device 22d to close both the fourth positive side contactor 22d1 and the fourth negative side contactor 22d2. As a result, the second main power source device 14b is connected to the second power supply circuit 12b by the contactor device 22b, and the second main power source device 14b is connected to the fourth power supply circuit 12d by the contactor device 22d. Therefore, electric power is supplied from the second main power source device 14b to the second load device 16b and the fourth load device 16d.

The first control device 30a controls the contactor device 26a to close both the first positive side contactor 26a1 and the first negative side contactor 26a2. As a result, the first auxiliary power source device 24a is connected to the first load device 16a by the contactor device 26a, and electric power is supplied from the first auxiliary power source device 24a to the first load device 16a.

The second control device 30b controls the contactor device 26b to close both the second positive side contactor 26b1 and the second negative side contactor 26b2. As a result, the second auxiliary power source device 24b is connected to the second load device 16b by the contactor device 26b, and electric power is supplied from the second auxiliary power source device 24b to the second load device 16b.

The third control device 30c controls the contactor device 26c to close both the third positive side contactor 26c1 and the third negative side contactor 26c2. As a result, the third auxiliary power source device 24c is connected to the third load device 16c by the contactor device 26c, and electric power is supplied from the third auxiliary power source device 24c to the third load device 16c.

The fourth control device 30d controls the contactor device 26d to close both the fourth positive side contactor 26d1 and the fourth negative side contactor 26d2. As a result, the fourth auxiliary power source device 24d is connected to the fourth load device 16d by the contactor device 26d, and electric power is supplied from the fourth auxiliary power source device 24d to the fourth load device 16d.

The first control device 30a controls the connection device 20a to open the first connector 20a1, and the second control device 30b controls the connection device 20a to open the second connector 20a2. As a result, the connection between the first power supply circuit 12a and the second power supply circuit 12b is interrupted by the connection device 20a.

The third control device 30c controls the connection device 20b to open the third connector 20b3, and the fourth control device 30d controls the connection device 20b to open the fourth connector 20b4. As a result, the connection between the third power supply circuit 12c and the fourth power supply circuit 12d is interrupted by the connection device 20b.

[Operation of Power Supply System in Event of Abnormality (1)]

Figure 3:
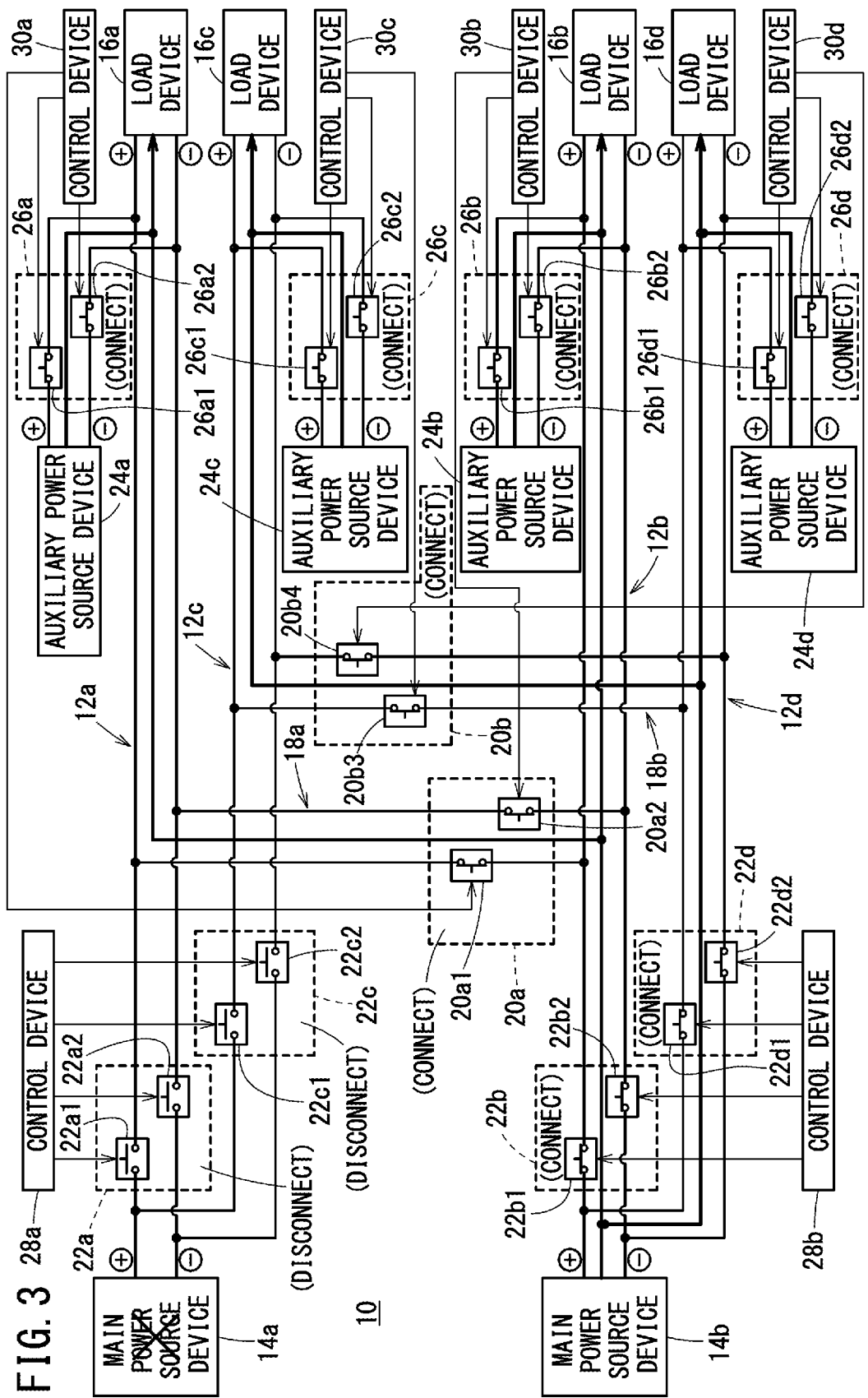
FIG. 3 is a diagram showing the operation of the power supply system in the event of an abnormality.

FIG. 3 is a diagram showing the operation of the power supply system 10 in the event of an abnormality. Arrows shown in FIG. 3 indicate electric power supply paths. FIG. 3 shows the operation of the power supply system 10 when the supply of electric power from the first main power source device 14a to the first power supply circuit 12a and the third power supply circuit 12c is cut off.

The state in which the supply of electric power from the first main power source device 14a to the first power supply circuit 12a and the third power supply circuit 12c is cut off is, for example, a state in which the first main power source device 14a is stopped and cannot be restarted, or a state in which a short circuit, a disconnection, or the like has occurred between the first main power source device 14a and the contactor device 22a or between the first main power source device 14a and the contactor device 22c.

When the supply of electric power from the first main power source device 14a to the first power supply circuit 12a and the third power supply circuit 12c is cut off, the first control device 28a controls the contactor device 22a to open both the first positive side contactor 22a1 and the first negative side contactor 22a2. As a result, as shown in FIG. 3, the first main power source device 14a is disconnected from the first power supply circuit 12a and the first connection circuit 18a by the contactor device 22a.

Further, the first control device 28a controls the contactor device 22c to open both the third positive side contactor 22c1 and the third negative side contactor 22c2. As a result, as shown in FIG. 3, the first main power source device 14a is disconnected from the third power supply circuit 12c and the second connection circuit 18b by the contactor device 22c.

Furthermore, the first control device 30a controls the connection device 20a to close the first connector 20a1, and the second control device 30b controls the connection device 20a to close the second connector 20a2. As a result, as shown in FIG. 3, the first power supply circuit 12a and the second power supply circuit 12b are connected to each other via the first connection circuit 18a by the connection device 20a. Therefore, electric power is supplied from the second main power source device 14b to the first load device 16a.

In addition, the third control device 30c controls the connection device 20b to close the third connector 20b3, and the fourth control device 30d controls the connection device 20b to close the fourth connector 20b4. As a result, as shown in FIG. 3, the third power supply circuit 12c and the fourth power supply circuit 12d are connected to each other via the second connection circuit 18b by the connection device 20b. Therefore, electric power is supplied from the second main power source device 14b to the third load device 16c.

[Operation of Power Supply System in Event of Abnormality (2)]

Figure 4:
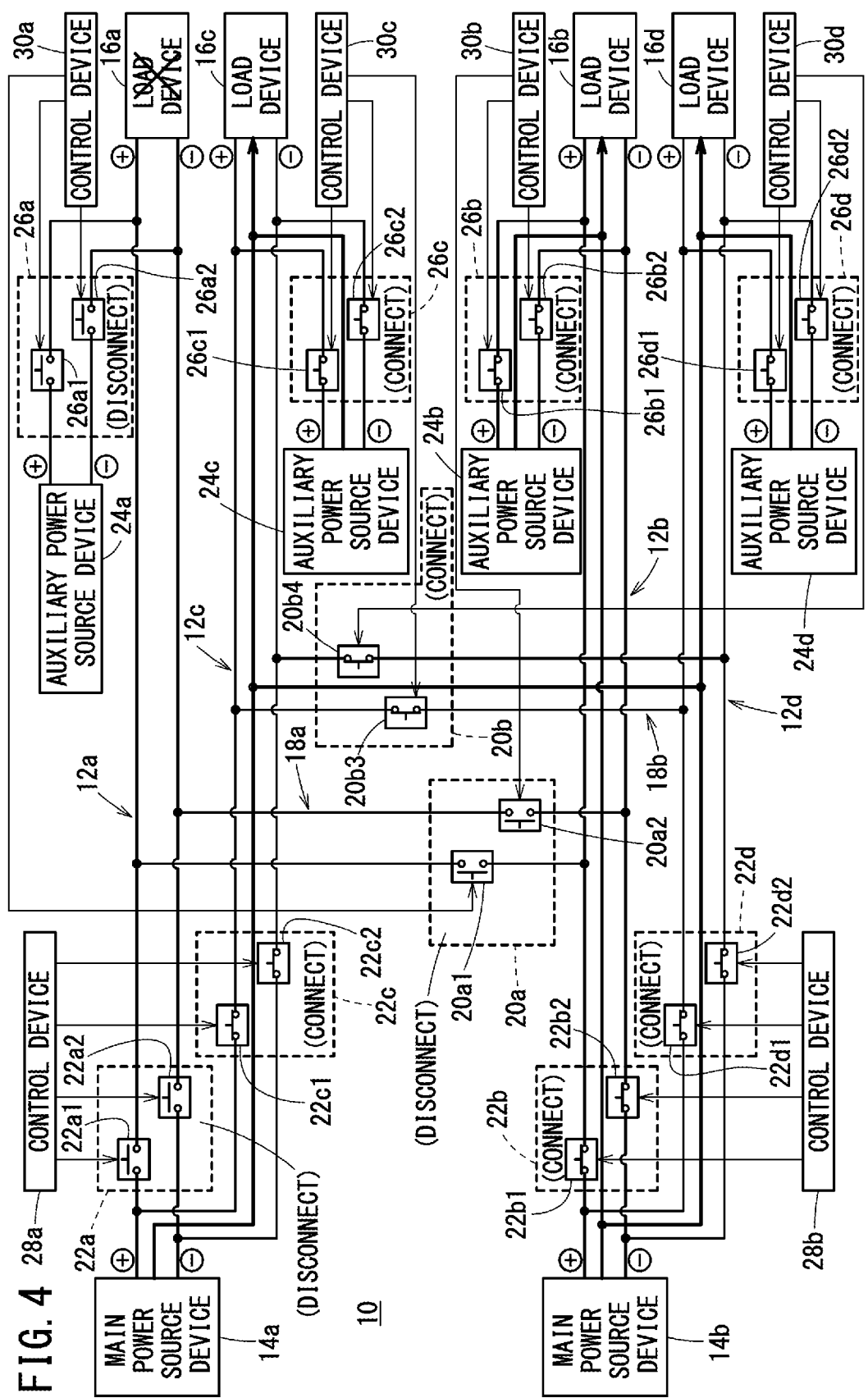
FIG. 4 is a diagram showing the operation of the power supply system in the event of an abnormality.

FIG. 4 is a diagram showing the operation of the power supply system 10 in the event of an abnormality. Arrows shown in FIG. 4 indicate electric power supply paths. FIG. 4 shows the operation of the power supply system 10 in a case where the supply of electric power from the first main power source device 14a to the first load device 16a is stopped.

The state in which the supply of electric power from the first main power source device 14a to the first load device 16a is stopped is, for example, a state in which the first load device 16a is stopped and cannot be restarted, or a state in which a short circuit, disconnection, or the like has occurred between the contactor device 22a and the first load device 16a.

When the supply of electric power from the first main power source device 14a to the first load device 16a is stopped, the first control device 28a controls the contactor device 22a to open both the first positive side contactor 22a1 and the first negative side contactor 22a2. As a result, as shown in FIG. 4, the first main power source device 14a is disconnected from the first power supply circuit 12a and the first connection circuit 18a by the contactor device 22a.

Further, the third control device 30c controls the connection device 20b to close the third connector 20b3, and the fourth control device 30d controls the connection device 20b to close the fourth connector 20b4. As a result, as shown in FIG. 4, the third power supply circuit 12c and the fourth power supply circuit 12d are connected to each other via the second connection circuit 18b by the connection device 20b. Therefore, electric power is supplied from the first main power source device 14a to the fourth load device 16d.

[Operation of Power Supply System when Connection Device Malfunctions]

Figure 5:
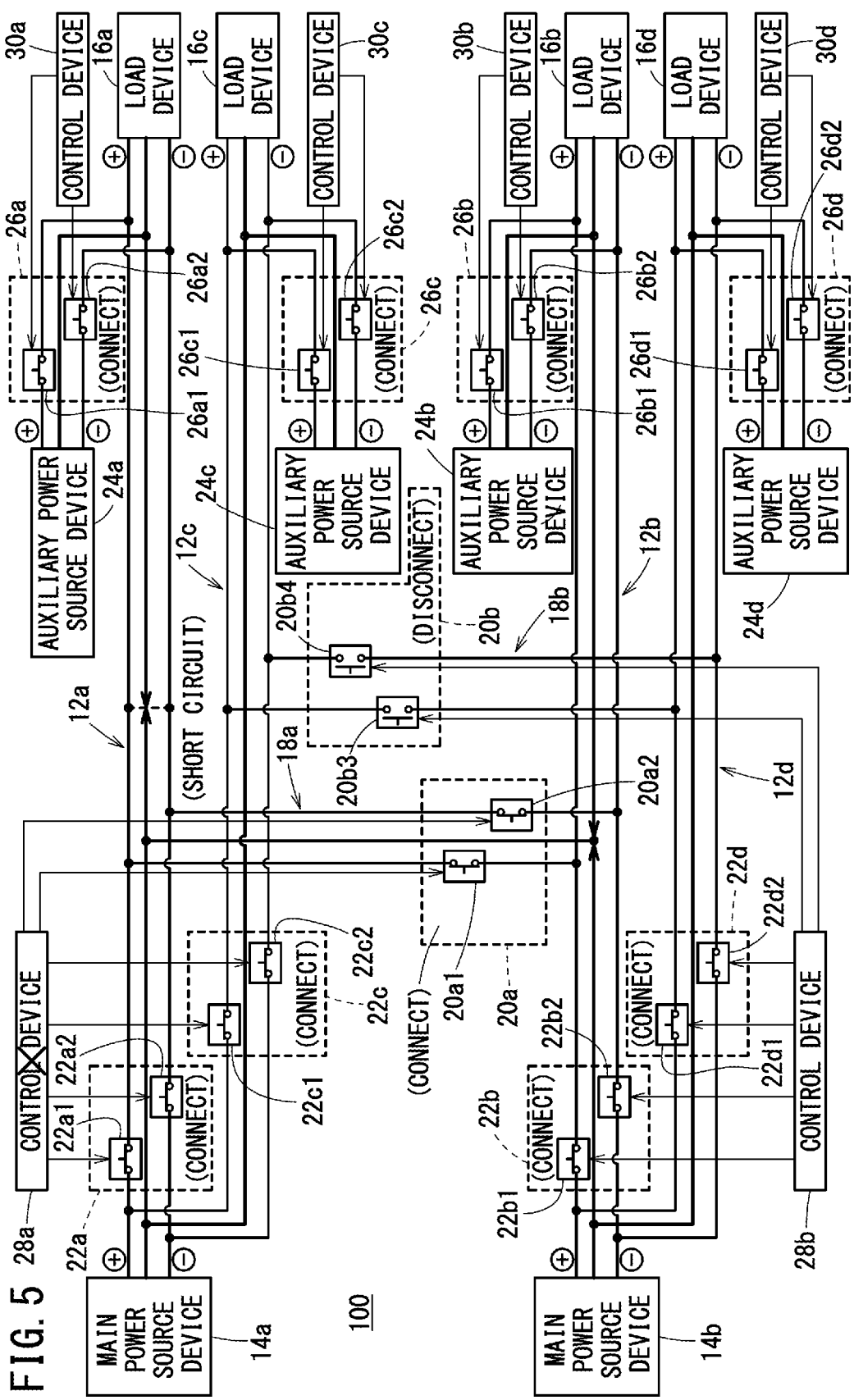
FIG. 5 is a diagram showing the operation of the power supply system when a connection device malfunctions.

FIG. 5 is a diagram showing the operation of a power supply system 100 when the connection device 20a malfunctions.

The state in which the connection device 20a malfunctions is, for example, a state in which at least one of the first connector 20a1 or the second connector 20a2 of the connection device 20a is erroneously closed.

Unlike the power supply system 10 (FIG. 1) of the present embodiment, in the power supply system 100 of a comparative example shown in FIG. 5, the connection device 20a is controlled by the single first control device 28a. Therefore, if the first control device 28a fails, the failed first control device 28a may close both the first connector 20a1 and the second connector 20a2. For example, when a short circuit occurs in the first power supply circuit 12a, all of the first load device 16a, the second load device 16b, the third load device 16c, and the fourth load device 16d may stop.

Figure 6:
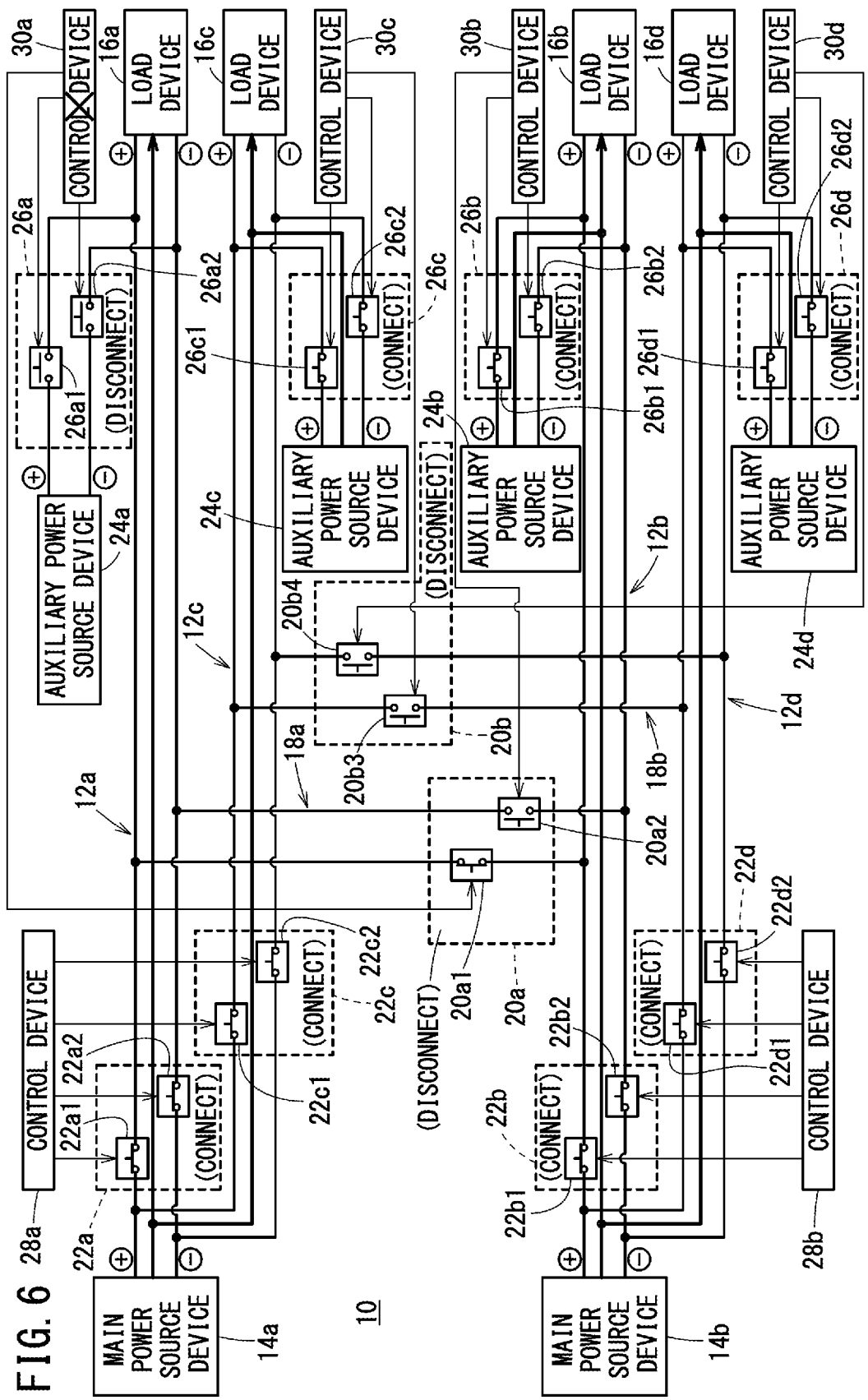
FIG. 6 is a diagram showing the operation of the power supply system when the connection device malfunctions.

FIG. 6 is a diagram showing the operation of the power supply system 10 when the connection device 20a malfunctions.

In the power supply system 10 of the present embodiment, the connection device 20a is controlled by two control devices, that is, the first control device 30a and the second control device 30b. Therefore, even when the first control device 30a that has failed closes the first connector 20a1, the second control device 30b that is normally operating opens the second connector 20a2, and therefore, the connection device 20a can maintain the interruption state. Therefore, for example, even when a short circuit occurs in the first power supply circuit 12a, the second load device 16b and the fourth load device 16d can continue to operate.

The first control device 30a that has failed may open the first positive side contactor 26a1 and the first negative side contactor 26a2 to bring the contactor device 26a into the interruption state. In this case, no electric power is supplied from the first auxiliary power source device 24a to the first load device 16a. However, since the first control device 28a that is normally operating brings the contactor device 22a into the connection state, electric power is supplied from the first main power source device 14a to the first load device 16a. Therefore, the operation of the first load device 16a can be continued.

Second Embodiment

FIG. 7 is a schematic view of a moving object 44. The power supply system 10 is mounted on the moving object 44.

The moving object 44 of the present embodiment is an electric vertical take-off and landing aircraft (eVTOL aircraft). The moving object 44 includes eight VTOL rotors 46. The VTOL rotors 46 generate upward thrust for a fuselage 48. The moving object 44 includes eight electric motors 50. One electric motor 50 drives one VTOL rotor 46. The moving object 44 includes two cruise rotors 52. The cruise rotors 52 generate forward thrust for the fuselage 48. The moving object 44 includes four electric motors 54. Two electric motors 54 drive one cruise rotor 52.

Each of the first load device 16a, the second load device 16b, the third load device 16c, and the fourth load device 16d may include two electric motors 50 and one electric motor 54. Each of the first load device 16a, the second load device 16b, the third load device 16c, and the fourth load device 16d may include a low-voltage drive device in addition to the electric motors 50 and the electric motor 54.

The moving object 44 is not limited to an aircraft, and may be a ship, an automobile, a train, or the like.

The following notes (appendices) are further disclosed in relation to the above-described embodiments.

APPENDIX 1

The power supply system (10) includes: the first power supply circuit (12a) configured to supply, to the first load device (16a), DC power output from the first main power source device (14a); the second power supply circuit (12b) configured to supply, to the second load device (16b), DC power output from the second main power source device (14b); the first connection circuit (18a) including the first connector (20a1) and the second connector (20a2) that are configured to connect the first power supply circuit and the second power supply circuit to each other; the first contactor (26a1) provided in the first power supply circuit; the second contactor (26b1) provided in the second power supply circuit; the first control device (30a) configured to control the first connector and the first contactor; and the second control device (30b) configured to control the second connector and the second contactor. According to such a configuration, the first control device for controlling the first connector and the second control device for controlling the second connector are different from each other. Therefore, even when one of the first control device or the second control device fails, the connection between the first power supply circuit and the second power supply circuit can be interrupted. Further, the first control device controls the first connector and the first contactor, and the second control device controls the second connector and the second contactor, and therefore, the number of control devices can be reduced. This in turn contributes to energy efficiency.

APPENDIX 2

In the power supply system according to Appendix 1, the first connector may be provided on the positive wire of the first connection circuit, and the second connector may be provided on the negative wire of the first connection circuit. According to such a configuration, when at least one of the first connector or the second connector is opened, the connection between the first power supply circuit and the second power supply circuit can be interrupted.

APPENDIX 3

The power supply system according to Appendix 1 or 2 may further include the first auxiliary power source device (24a) connected to the first power supply circuit in parallel with the first main power source device, and the second auxiliary power source device (24b) connected to the second power supply circuit in parallel with the second main power source device, the first contactor may be configured to disconnect the first auxiliary power source device from the first power supply circuit, and the second contactor may be configured to disconnect the second auxiliary power source device from the second power supply circuit. According to such a configuration, the first control device for controlling the first connector and the second control device for controlling the second connector are different from each other. Therefore, even when one of the first control device or the second control device fails, the connection between the first power supply circuit and the second power supply circuit can be interrupted.

APPENDIX 4

The power supply system according to Appendix 3 may further include: the third power supply circuit (12c) configured to supply, to the third load device (16c), the DC power output from the first main power source device; the third auxiliary power source device (24c) connected to the third power supply circuit in parallel with the first main power source device; the third contactor (26c1) configured to disconnect the third auxiliary power source device from the third power supply circuit; the fourth power supply circuit (12d) configured to supply, to the fourth load device (16d), the DC power output from the second main power source device; the fourth auxiliary power source device (24d) connected to the fourth power supply circuit in parallel with the second main power source device; the fourth contactor (26d1) configured to disconnect the fourth auxiliary power source device from the fourth power supply circuit; the second connection circuit (18b) including the third connector (20b3) and the fourth connector (20b4) that are configured to connect the third power supply circuit and the fourth power supply circuit to each other; the third control device (30c) configured to control the third connector and the third contactor; and the fourth control device (30d) configured to control the fourth connector and the fourth contactor. According to such a configuration, the third control device for controlling the third connector and the fourth control device for controlling the fourth connector are different from each other. Therefore, even when one of the third control device or the fourth control device fails, the connection between the third power supply circuit and the fourth power supply circuit can be interrupted.

APPENDIX 5

In the power supply system according to any one of Appendices 1 to 4, the first connector may be a normally-open connector configured to be opened when no signal is input from the first control device to the first connector and to be closed when a signal is input from the first control device to the first connector, and the second connector may be a normally-open connector configured to be opened when no signal is input from the second control device to the second connector and to be closed when a signal is input from the second control device to the second connector. According to such a configuration, the first control device for controlling the first connector and the second control device for controlling the second connector are different from each other. Therefore, when one of the first control device or the second control device fails and a signal is not input to one of the first connector or the second connector, the connection between the first power supply circuit and the second power supply circuit can be interrupted.

APPENDIX 6

The moving object (44) includes the power supply system according to any one of Appendices 1 to 5. According to such a configuration, the first control device for controlling the first connector and the second control device for controlling the second connector are different from each other. Therefore, even when one of the first control device or the second control device fails, the connection between the first power supply circuit and the second power supply circuit can be interrupted. This in turn contributes to energy efficiency.

The present invention is not limited to the above disclosure, and various modifications are possible without departing from the essence and gist of the present invention.

In the above disclosure, the first control device 30a controls the first connector 20a1, and the second control device 30b controls the second connector 20a2. In contrast, the first control device 30a may control the first connector 20a1, and the third control device 30c may control the second connector 20a2. Also, the first control device 28a may control the first connector 20a1, and the second control device 28b may control the second connector 20a2. In other words, it is sufficient so long as the control device for controlling the first connector 20a1 and the control device for controlling the second connector 20a2 are different from each other.

In the above disclosure, the third control device 30c controls the third connector 20b3, and the fourth control device 30d controls the fourth connector 20b4. In contrast, the second control device 30b may control the third connector 20b3, and the fourth control device 30d may control the fourth connector 20b4. Also, the first control device 28a may control the third connector 20b3, and the second control device 28b may control the fourth connector 20b4. In other words, it is sufficient so long as the control device for controlling the third connector 20b3 and the control device for controlling the fourth connector 20b4 are different from each other.

The invention claimed is:

1. A power supply system comprising:
a first power supply circuit configured to supply, to a first load device, direct current electric power output from a first main power source device;
a second power supply circuit configured to supply, to a second load device, direct current electric power output from a second main power source device;
a first auxiliary power source device connected to the first power supply circuit in parallel with the first main power source device;
a second auxiliary power source device connected to the second power supply circuit in parallel with the second main power source device;
a first connection circuit including a first connector and a second connector that are configured to connect the first power supply circuit and the second power supply circuit to each other;
a first contactor configured to disconnect the first auxiliary power source device from the first power supply circuit;
a second contactor configured to disconnect the second auxiliary power source device from the second power supply circuit;
a first control device configured to control the first connector and the first contactor; and
a second control device configured to control the second connector and the second contactor.

2. The power supply system according to claim 1, wherein
the first connector is provided on a positive wire of the first connection circuit, and
the second connector is provided on a negative wire of the first connection circuit.

3. The power supply system according to claim 1, further comprising:
a third power supply circuit configured to supply, to a third load device, the direct current electric power output from the first main power source device;
a third auxiliary power source device connected to the third power supply circuit in parallel with the first main power source device;
a third contactor configured to disconnect the third auxiliary power source device from the third power supply circuit;
a fourth power supply circuit configured to supply, to a fourth load device, the direct current electric power output from the second main power source device;
a fourth auxiliary power source device connected to the fourth power supply circuit in parallel with the second main power source device;
a fourth contactor configured to disconnect the fourth auxiliary power source device from the fourth power supply circuit;
a second connection circuit including a third connector and a fourth connector that are configured to connect the third power supply circuit and the fourth power supply circuit to each other;
a third control device configured to control the third connector and the third contactor; and
a fourth control device configured to control the fourth connector and the fourth contactor.

4. The power supply system according to claim 1, wherein
the first connector is a normally-open connector configured to be opened when no signal is input from the first control device to the first connector and to be closed when a signal is input from the first control device to the first connector, and
the second connector is a normally-open connector configured to be opened when no signal is input from the second control device to the second connector and to be closed when a signal is input from the second control device to the second connector.

5. A moving object comprising the power supply system according to claim 1.

* * * * *